Nov. 29, 1966   R. M. HOUGH   3,288,052
COATING APPARATUS
Filed Aug. 7, 1963

INVENTOR.
RICHARD MURRAY HOUGH
BY
ATTORNEYS

United States Patent Office 3,288,052
Patented Nov. 29, 1966

3,288,052
COATING APPARATUS
Richard Murray Hough, Sunfield, Mich.
Filed Aug. 7, 1963, Ser. No. 300,551
7 Claims. (Cl. 99—235)

This invention relates to a coating apparatus, and more particularly to apparatus for coating a liquid on individual granular particles on a continuous basis.

One typical use of granular coating apparatus is to coat fatty substances on feed pellets for animals. Presently available equipment for mixing the fatty substance with the feed is normally lacking in the capacity to coat each of the individual pellets uniformly and continuously and still do so at a high output rate. Consequently, feed manufacturers, in order to provide a large output on an economical basis often mix the fatty substance into a heterogeneous composition rather than a homogeneous one. Apparatus which has been devised heretofore to coat individual pellets on a continuous, thorough, homogeneous basis operate at impractically small output rates. With this prior apparatus, the contact angle of the liquid distributed onto the pellets is normally so small, usually around 15° to 20° or less, that the pellets must be spaced greatly from each other to even be coated, thereby reducing the output rate to very small amounts.

It is therefore an object of this invention to provide a novel apparatus capable of causing complete liquid contact and coating onto individual granules of pellets, enabling each granule to be completely coated on a uniform basis, yet to do so at a high production basis.

It is another object of this invention to provide a coating apparatus for pellets causing complete and thorough coating of individual pellets at a contact angle approaching 90° thereby substantially increasing the output rate rate due to the treatment of closely spaced pellets in a single layer, yet without sacrificing the thorough coating of the individual pellets.

It is another object of this invention to provide a coating apparatus having controlled, variable granular feed and distribution to meet desired coating specifications, thereby achieving lesser or greater application of the liquid to the pellet, still at a high rate.

It is another object of this invention to provide an animal pellet coating apparatus capable of applying a fatty substance to the pellets with complete homogeneity and without coagulation of the fatty substance in a manner to cause lumps of feed and conglomerated pellets, yet to do so on a rapid, continuous, economical basis.

These and other objects of this invention will become apparent upon studying the following specification in conjunction with the drawings in which.

Figure 1:
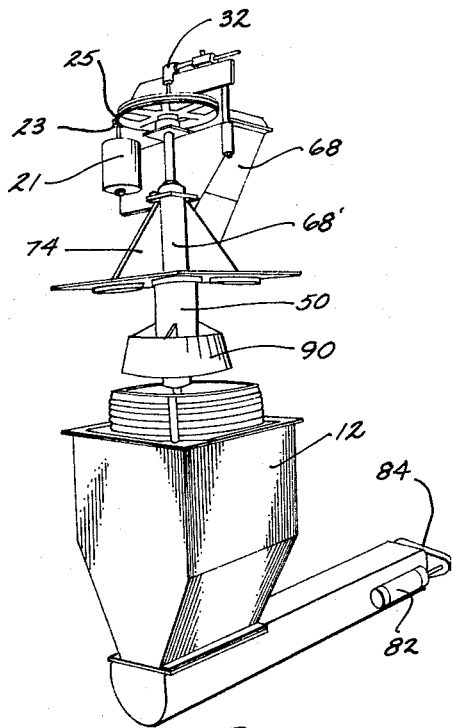
FIG. 1 is a perspective, partially exploded view of the novel coating apparatus.

Referring now specifically to the drawings, the novel coating apparatus 10 includes a housing 12 containing the coating apparatus and into which materials are fed from the top and removed from the lower end. Extending vertically through the central portion of the housing is a shaft 14 mounted in a set of bearings 16 and 18, and to which a driven pulley 20 is keyed at the upper end outside the housing. Shaft 14 is hollow to define an internal passageway 26 for heated fatty substance in the form of a liquid stream 28 emitted from a control orifice 30 of fluid line 32. A solenoid valve 34 controls flow through the line orifice. Positioned beneath the lower end of the hollow shaft 14 is a dish 36 receiving the flowing stream in its center and dished upwardly. The dish is mounted by a hub 38 to shaft 40 of electric motor 42 mounted within housing 12.

Figure 3:
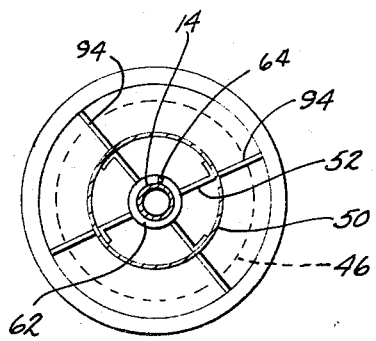
FIG. 3 is a sectional view taken on plane III—III of the apparatus in FIG. 2.

Affixed to the lower end of shaft 14 by a hub is a flat, granular-distributing disc 46 positioned above and coaxial to the liquid-distributing dish 36. Spaced above the disc 46 and spaced from the shaft 14 around the shaft is a feed control sleeve 50, annular in configuration, and mounted to shaft 14 by rib braces 52 (FIG. 3).

These ribs are mounted on their outer ends to the sleeve 50 and on their inner ends to a collar 62 affixed to shaft 14 by suitable set screws 64. By loosening the set screws 64 the feed control sleeve 50 can be vertically adjusted on shaft 14 to thus space it a controlled distance from the granule distributing disc 46. This, thereby, controls the amount of feed passing between the sleeve and the disc to be centrifugally distributed outwardly from the disc.

The granular material is fed into this sleeve from a hopper 68 at the upper end of the housing. The housing is eccentrically mounded on its upper end with respect to shaft 14, and has its lower end concentrically mounted with shaft 14 to extend somewhat telescopically with the sleeve 50 with granular transition flow therebetween. The lower end of the hopper in essence comprises an annular concentric tube 68' supported by the radial flanges 74 secured to the top 76 of the housing 12.

Figure 2:
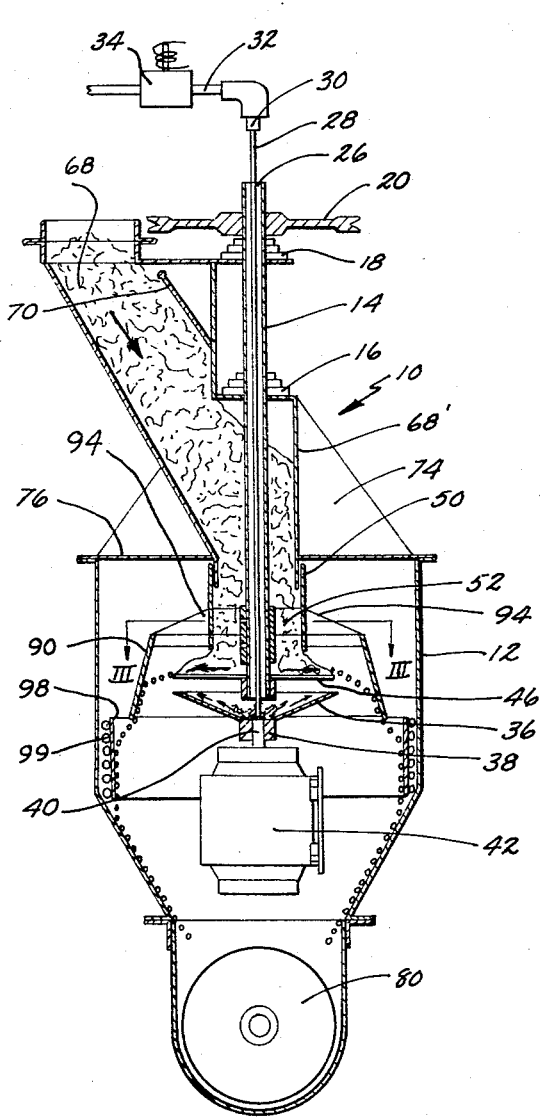
FIG. 2 is a side elevational sectional view of the apparatus illustrated in FIG. 1.

Preferably, in the upper end of the hopper 68 is positioned a pivotal gate signal 70 which shifts between the position illustrated in FIG. 2 when the material is flowing, to a downward position when the material stops flowing in adequate supply. Downward shifting of the gate closes the solenoid valve 34 to stop the liquid supply.

The lower end of housing 12 is open to communicate with an inlet of a conventional ribbon mixing screw mechanism 80. This screw mechanism is driven by a suitable motor 82 through a reduction drive 84 to remove the coated material from the bottom of the apparatus.

Positioned around the peripheries of dish 36 and disc 46, and extending above and below the elements in a spaced manner therefrom, is an important frustoconical detention ring 90 which has its larger diameter portion at the lower end thereof, and has its upper portion affixed to sleeve 50 by support ribs 94. Consequently, when shaft 14 is rotated by the driven pulley 20, sleeve 50 also rotates at the same angular velocity, as does detention ring 90 and distribution disc 46. Driven pulley 20 is rotated with a suitable variable speed motor 21 through its pulley 23 and a V-belt 25. This detention ring is important in its configuration, location, and orientation to achieve high speed and thorough coating of the individual articles. The angle between the inner wall of the detention ring and the surface of the liquid distribution disc 36 is close to 90°. The exact relationship between the disc, dish and ring will be discussed more specifically under the operation description to follow.

Positioned below the lower edge of the frustoconical ring 90 is an annular wall 98 having heating coils 99 of steam, for example, therearound to maintain the coated particles in a heated condition to cause penetration of the particles with the fatty material to be coated, thereby preventing surface coagulation between particles when they cool.

*Operation*

During operation of the novel coating apparatus, the liquid fatty substance, which is pre-heated, is sent through the solenoid valve 34 when open, through line 32, down through orifice 30, in a stream through the vertical hollow shaft 14 via passageway 26, and down onto the center of dish 36. The dish is rotating at a very rapid rate using the high speed motor 42, to produce a rim speed, for example, of about 10,000 feet per minute. This causes the liquid to be centrifugally dispersed in a mist form from the periphery of the dish.

Simultaneously, granular material in the form of pellets or the like is fed through the hopper 68, down around lower hopper portion 68', through control sleeve 50, and onto the surface of distributing disc 46 above dish 36. This disc, like sleeve 50, is rotated at speeds of up to approximately 70 revolutions per minute to provide a controlled, variable flow rate for the granular material. The minimum speed is a value where granules will just flow off disc 46 at an even rate due to centrifugal force. The maximum speed is a value just before flow granules stop flowing due to hang-up by centrifugal force in sleeve 50.

The individual particles are centrifugally dispersed from the disc 46 against the inner wall of the frustoconical detention ring 90. They are distributed and guided along the detention ring in a mono-layer, i.e. one pellet thick, but close together to form a very efficient process. The mist of liquid from the dish 36 contacts the individual granules just about at the time the granules are contacting the wall of the detention ring 90. Since the particles tend to fall a slight bit, due to gravity, after leaving disc 46 and before contact with detention ring 90, the dish 36 is specifically located with respect to disc 46 to cause the contact of the liquid on the granules to be at a slight spacing below the lower edge of the disc 46. This achieves optimum coating. Since the angle of contact of the liquid with the material passing down the wall of the detention ring approaches 90°, the moving particles can be very close together while still achieving complete effective coating of each particle, thereby providing a homogeneous feed material.

The coated particles then pass down the remainder of the wall in a diagonal path, downwardly and slightly outwardly, and then into contact with the heated annular surface 98 to maintain the fatty material at an elevated temperature. The feed then passes down the lower ends of the housing 12 and into the ribbon mixing screw mechanism 80, where it is transferred to an outlet on its opposite lower end for bagging or alternatively to storage bins.

The entire operation is extremely efficient, with capacities of 1,000 cubic feet per hour on a detention ring of 1½ to 2 feet in diameter being readily achieved. Moreover, the particular amount of coating material to be applied is easily controlled merely by varying the speed of the material-distributing disc 46 for the particular liquid flow rate introduced. This apparatus, therefore, for the first time achieves high production rate and individual particle coating simultaneously, efficiently, and effectively.

This novel means of coating does not damage the pellets due to the gentle sliding action on disc 46 which has no bars or paddles to fracture the pellets. Nor is there anything after the pellets leave the disc to strike the pellets and damage them.

Other inherent advantages of this novel apparatus will readily occur to those skilled in this art upon studying this specification and the form of the invention depicted. Also, certain minor obvious structural modifications to suit a particular material or situation can readily be made in the novel apparatus without departing from the novel principles and concepts taught. Therefore, the invention is not to be limited only to the depicted and described form illustrated.

I claim:

1. A coating apparatus comprising: a driven, rotational granule-distributing disc; granule feed means to said disc; a driven, rotational liquid-misting disc beneath and coaxial with said distributing disc; liquid feed means to said misting disc; a driven rotational frustoconical detention ring positioned around and spaced from the peripheries of said discs, and having its larger diameter portion at the bottom, causing downward particle feed flow past the periphery of said liquid misting disc.

2. A coating apparatus comprising: a hollow rotational shaft and drive means to rotate said shaft; a granular material inlet sleeve around and spaced from said shaft, and connected thereto to rotate with the shaft; an annular, granular material distributing disc attached to the lower end of said shaft to spin granular material centrifugally therefrom; a high speed, liquid mist distributing dish beneath said hollow shaft to receive liquid material passed through said hollow shaft, and drive means therefor; a frustoconical detention guide ring spaced around the periphery of said disc, having its larger diameter portion downwardly, to receive and deflect distributed granular material diagonally downwardly and outwardly, and also spaced around said dish to guide the granular material past the misting liquid to cause an effective and efficient contact angle approaching 90°.

3. The apparatus in claim 2 wherein said sleeve is adjustable on said shaft with respect to said disc to accommodate varying granular material flow rates.

4. The apparatus in claim 2 wherein the angle between the wall of said detention ring and said dish approaches 90°.

5. The apparatus in claim 2 wherein a heated wall is positioned adjacent the bottom of said detention ring to receive the coated granular material from the ring.

6. The apparatus in claim 2 wherein said ring, dish, and disc are spaced to cause liquid from said dish to contact granular material from said disc as the granular material contacts and begins to move downwardly and outwardly along the inner wall of said ring.

7. The apparatus in claim 1 wherein said liquid misting disc is generally dish shaped.

References Cited by the Examiner

UNITED STATES PATENTS

| | | | |
|---|---|---|---|
| 1,468,119 | 9/1923 | MacLachlan | 239—224 X |
| 1,855,548 | 4/1923 | Forster | 99—235 X |
| 2,823,904 | 2/1958 | Gustafson | 118—303 X |
| 3,086,712 | 4/1963 | Frazier | 239—224 X |
| 3,177,058 | 4/1965 | Slayter et al. | 239—222 X |

FOREIGN PATENTS

| | | |
|---|---|---|
| 560,731 | 4/1944 | Great Britain. |

LOUIS O. MAASSEL, *Primary Examiner.*